May 30, 1961   W. A. WAGNER ET AL   2,986,218
VARIABLE EXPOSURE RAM AIR TURBINE
Filed May 25, 1959   2 Sheets-Sheet 2
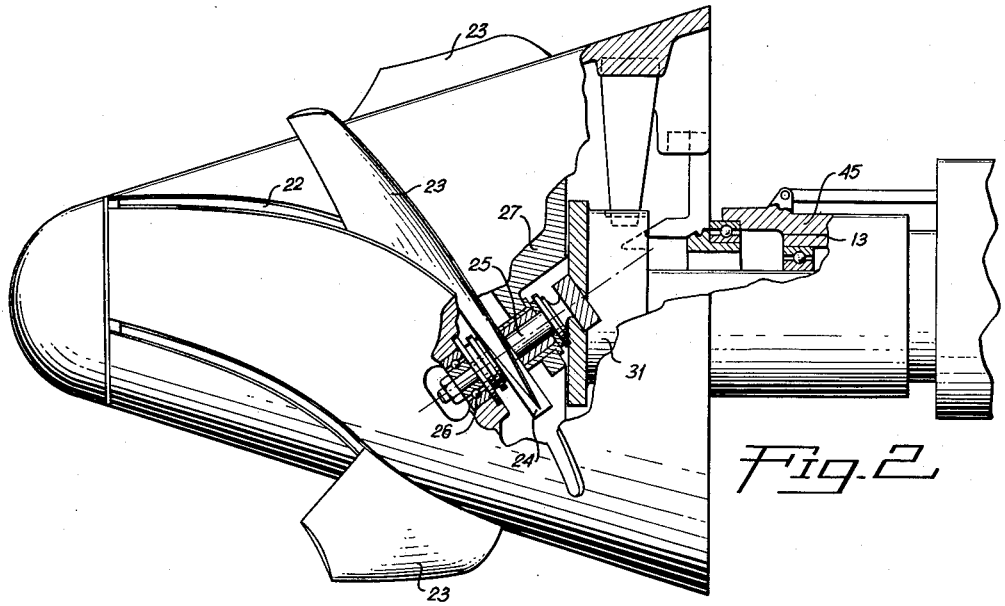
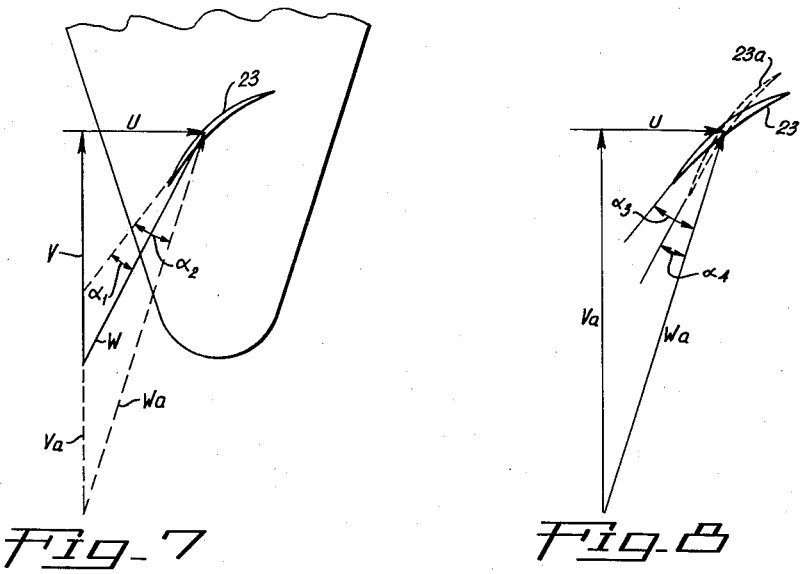
INVENTORS
WILLIAM A. WAGNER
ROLAND H. THORSELL
BY
ATTORNEY

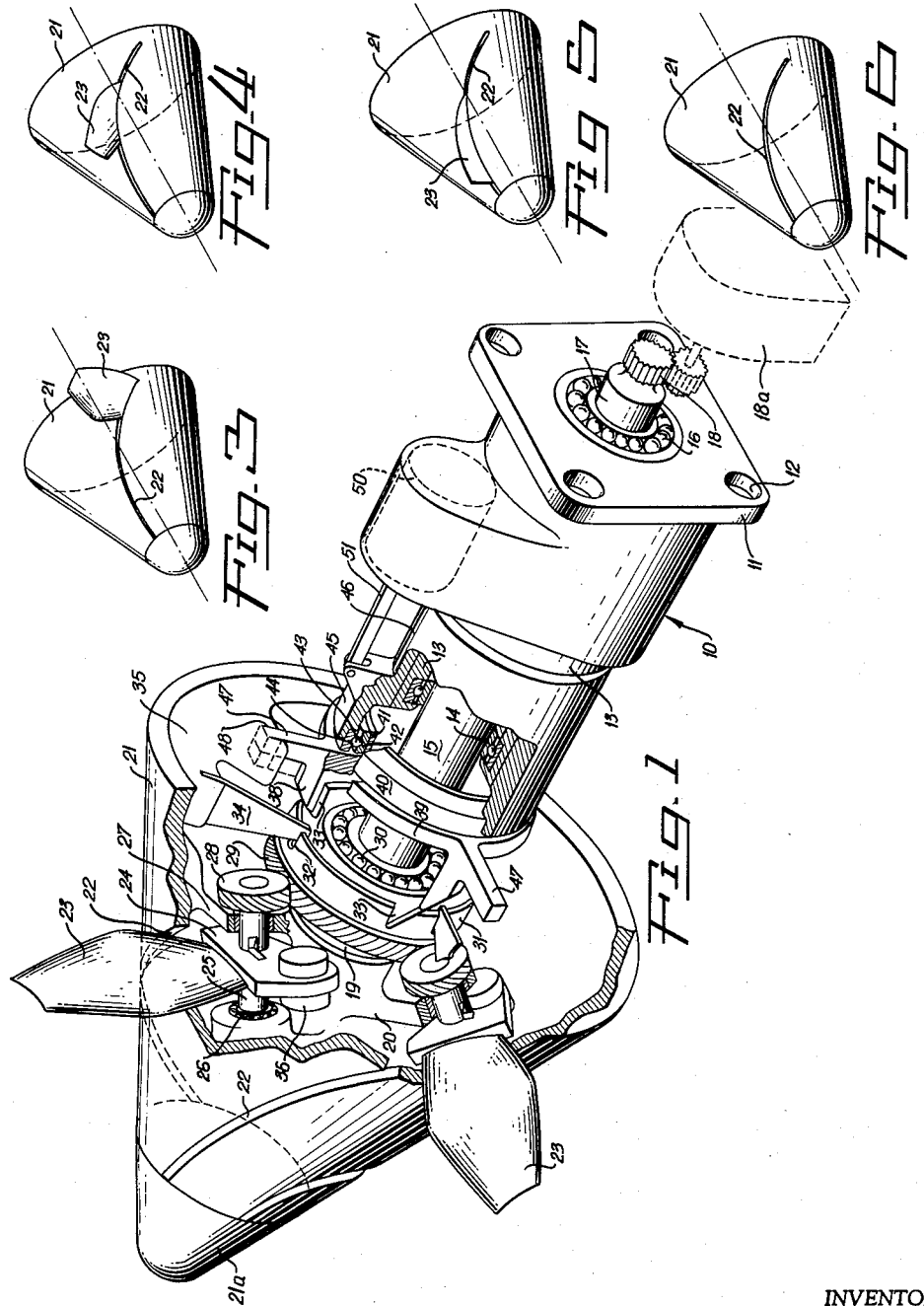

2,986,218
VARIABLE EXPOSURE RAM AIR TURBINE

William A. Wagner, Sepulveda, and Roland H. Thorsell, Granada Hills, Calif., assignors to The Marquardt Corporation, a corporation of California Filed May 25, 1959, Ser. No. 815,614

8 Claims. (Cl. 170—60)

This invention relates to a variable exposure ram air turbine and more particularly to a ram air turbine having minimum operating and non-operating drag.

Ram air turbines are utilized as a source of auxiliary power for aircraft and other fast moving craft, and present turbines have the full blade length continually presented to the airstream regardless of the power output requirement. Thus, the blades are always a source of drag when placed in the airstream regardless of whether or not the ram turbine is operating to produce power. The ram air turbine of the present invention utilizes flexible blades which are extended outwardly from a turbine housing by an amount corresponding to the power required and which are completely retracted into the turbine housing when no power output is required. Therefore, the blades represent no drag penalty whatsoever during non-operation of the turbine and during operation of the turbine, minimum drag will be presented by the turbine blades since the blades are inserted to the airstream only by an amount necessary to perform the required power output.

The flexible turbine blades work through guide slots in the turbine housing and, as the blades are extended or retracted, their positions in the slots are changed to change a projected area of the blades and to change the angle of attack of the blades to the airstream. Constant rotational speed of the turbine can be maintained by proper positioning of the blades in the guide slots and this positioning is accomplished by the use of a proportional type governor mechanism which moves the blades to the required position. Since the governor mechanism controls both the projected blade area and the angle attacks of the blades, the turbine is operative over a wide range of altitude and flight speed to convert ram air into useful shaft power.

It is therefore an object of the present invention to provide a ram air turbine in which both the exposed blade area and the angle of attack of the blades can be varied to maintain minimum blade drag during operation of the turbine to produce the required power output.

Another object of the present invention is to provide a variable exposure ram air turbine which utilizes flexible blades movable in curved guide slots to vary the exposed blade area and angle of attack.

A further object of the present invention is to provide a variable exposure ram air turbine having blades which can be fully retracted into the turbine housing so that no drag penalty results from the blades during periods when the turbine is not operating to produce power.

These and other objects of the invention not specifically set forth above will become readily apparent from the accompanying description and drawing in which:

Figure 1 is a perspective view, partially in section, of the ram air turbine of the present invention.

Figure 2 is a side elevational view, partly in section, showing the flexible blades located in the curved guide slots in the turbine housing.

Figures 3–6 are partial perspective views showing progressive positions of the blade from fully extended to fully retracted.

Figure 7 is a vector diagram illustrating the manner in which the relative angle of attack of the blades changes with forward flight speed.

Figure 8 is a vector diagram showing the manner in which the relative angle of attack of the blades changes with blade position.

The embodiment of the invention illustrated in Figures 1 and 2 comprises a stationary support member 10 rigidly connected with an end plate 11 containing openings 12 for attachment to a supporting structure, such as an aircraft. The support member 10 has a cylindrical extension 13 containing ball bearings 14 for rotatably supporting a turbine shaft 15. Also, the end plate 11 contains ball bearing 16 for supporting the output end 17 of shaft 15. The shaft end 17 terminates in a gear 18 for attachment of the shaft to a power unit 18a, such as a hydraulic pump or an electric generator. The opposite end 19 of the turbine shaft is rigidly keyed within an opening in partition member 20 located within the turbine housing 21 so that the housing 21 and the shaft rotate together. The housing 21 contains a plurality of curved blade slots 22, each of which contains a flexible turbine blade 23. One end of each blade is rigidly connected to a blade body 24, which is rigidly secured to a shaft 25. One end of shaft 25 is rotatably supported in a bearing 26 located in partition 20 and the other is rotatably supported in housing projection 27. A pinion gear 28 is secured to the end of shaft 25 and meshes with a synchro gear 29 rotatably supported on shaft 15 by bearings 30. The axis of the shaft 25 is angularly positioned with respect to the axis of the shaft 15 and the bearing 26 is slightly lower than the gear 28 so that the blades 23 have an initial forward tilt of a few degrees when in the fully extended position illustrated in Figure 1. The helical gearing on the gear 29 and pinion 28 will cause the shaft 25 and the gear 29 to rotate together even though the shaft 25 is angularly positioned with respect to the axis of the gear 29. The gear 29 has a cylindrical projection 31 containing a plurality of grooves 32 and a plurality of cam slots 33. Each of the grooves 32 receive one end of a leaf spring 34 and the other end is rigidly secured to a housing projection 35. In the present embodiment, four springs 34 are located at ninety degree intervals around the axis 15. Also, four slots 22 and four flexible blades 23 are equally spaced around the shaft 15 of the present embodiment. However, it is understood that any suitable number of springs, blades and guide slots can be employed.

The blade body 24 extends to one side of the axis of shaft 25 and carries the flyweight 36 which tends to move outwardly about the axis of the shaft 25 upon rotation of the turbine housing 21. The outward centrifugal force of the flyweight is transmitted through pinion 28 and gear 29 and is resisted by the leaf springs 34. When the centrifugal force on shaft 25 exceeds the resistance of springs 34, the flyweights will cause the flexible blades 23 to move forwardly and downwardly through the grooves 22. In Figure 1, the flyweights 36 are shown in the innermost position which corresponds with maximum blades extension. When it is desired to place the turbine in a non-operating condition, cams 38 are fully inserted into the cam slots 33 in projection 31 in order to rotate the gear 29 in a counter-clockwise direction and cause the pinion 28 to move the blade 23 to the fully retracted position within the turbine housing 21. The cams 38 are connected with a flange 39 of a ring 40. The ring 40 also has a flange 41 supported by the inner race 42 of ball bearings 43. Outer race 44 for the ball bearings 43 is rigidly connected with end 45 of a sleeve member 46 which is slidable on the support member 13. Thus, the end 45 of the slidable sleeve supports the ring 40 in concentric position about the shaft 15, while the bearings 43 permit rotation of the ring 40 relative to the sleeve 45. Rotation of the turbine housing is transmitted to the ring 40 by radial projections 47 from ring 40 which are slidable in grooves 48 in the housing projection 35.

The support member 10 contains an actuator motor 50 having an actuator rod 51 connected at one end with the slidable sleeve 45. Forward movement of the rod 51 causes complete insertion of the cams 38 into the cam slots 33 to fully retract the blades into the housing 21 while rearward movement of the rod withdraws the cams 38 and frees the blades for extension outwardly to produce shaft power. During operation of the turbine, the ends of the cams 38 extend only slightly into the cam slots 33 so that gear 29 con move the distances corresponding to the widest part of slots 33. In Figure 1, the end of the cams 38 are positioned to prevent any further clockwise motion of the gear 29 and any further outward extension of blades 23. When the gear 29 moves counter clockwise during operation of the turbine to engage the opposite side of slots 33 with the end of cams 38, the blades will be fully retracted within the housings and no further movement will be permitted. In the embodiment of Figure 1, four cams are positioned ninety degrees apart about the axis of the shaft 15 but it is understood that any suitable number of cams 38 can be utilized.

The blades 23 are constructed of thin, flexible material, such as stainless steel or fiberglass, so that the blades can twist as they move within the grooves 22. In Figures 3–5, the blades are shown in various extended positions while in Figure 6, the blades are shown in the fully retracted, non-operating position in which they are fully enclosed by the turbine housing 21. The turbine housing 21 has a nose section 21a and the slots 22 terminate at the nose section. Also, the housing is hollow, except for the supporting members, to permit the blades to move completely into the housing when fully retracted. It is therefore apparent that as the blades move outwardly from the retracted position, the projected blade area increases as does the angle of the blades relative to the turbine shaft 15. In determining the contour of the grooves 22, the desired output speed of the turbine shaft and the speed range of the fluid flowing past the turbine must be taken into consideration. At the highest fluid velocity, the minimum exposed blade area required to produce the rated power, as well as the relative angle of attack will determine the contour of the slots at the forward end of the turbine hub. Also, the exposed blade area and and relative angle of attack at the lowest operating fluid velocity will determine the contour of the aft end of the slots. The intermediate contour of the slots will be such as to provide for the progressive change in projected blade area and in blade angle relative to the turbine shaft.

In Figure 5, the initial angle of the blades to the turbine axis is illustrated as approximately 23° and in Figure 3, angle is illustrated as approximately 55°. The position of the blade 23 in Figure 4 is intermediate its extreme operating positions and the blades have a projected area and an angle of attack intermediate the minimum and maximum values. Therefore, for each position of the blades in the slots, a definite blade angle and a definite blade area will be obtained and this relationship between blade area and blade angle is such that both will increase and decrease together.

Referring to the vector diagram of Figure 7, the vector $u$ represents the rotational speed of the turbine while the vectors $v$ and $v_a$ represent the velocity of the fluid driving the turbine. The components $w$ and $w_a$ of these vectors represent the resultant air flow over the blades. As is apparent in Figure 7, an increase in the flight speed of the vehicle mounting the turbine from $v$ to $v_a$ results in an increase in a relative angle of attack from $\alpha$ to $\alpha_2$ between the blade 23 and the resultant air flow vector. In other words, the relative angle of attack for a lower flight speed is less than the relative angle of attack for a higher flight speed, assuming a constant rotational speed $u$ of the blade. Referring to Figure 8, the blade 23 is shown in two different angular positions (superimposed upon one another) assumed by the blade as it moves within the slot 22. In the full line position of the blade 23, the relative angle of attack $\alpha_3$ exists between the blades and the resultant vector $w$. As the blade moves forward in the slot 22, it will assume a position 23a in which the relative angle of attack $\alpha_4$ between the blade and the resultant velocity vector is reduced. It is therefore apparent that as the blades move from the maximum extended position to a forward retracted position, their angle to the longitudinal axis of the turbine is continually decreased and the relative angle of attack to the airstream also decreases for any given fluid velocity. If the flight speed and fluid velocity increases, less projected blade area is required to maintain a particular power output and as the blade area is reduced, the relative angle of attack is reduced. Thus, upon increase in fluid velocity, the blade angle relative to the longitudinal axis of the turbine is reduced to maintain a reasonable relative angle of attack to the blades.

When it is desired to place the turbine in operation, the actuator 50 is operated to withdraw the cams 38 from full insertion within cam slots 33. Thereafter, the centrifugal force of the flyweights 36 acts through pinion 28 and gear 29 against the springs 34 to position the blades 23 in the slots 22 at a location in which the projected blade angle and corresponding angle of attack is sufficient to drive the shaft 15 at the rated speed. In the event that flight speed and therefore the fluid velocity over the turbine should increase, or the load on the turbine shaft decrease, the turbine would tend to speed up and this would result in the flyweights moving outwardly to reduce the projected area and the blade angle until the turbine output again was just sufficient to drive the load at the designed speed. If the fluid velocity should decrease or the load increase, the turbine would tend to underspeed and the flyweights would move inwardly to move the blades into a more fully extended position to provide a higher blade angle and a greater projected area to maintain the rated speed.

Because of the rotation of the turbine housing, the thin blades are always kept in pure tension and these thin blades are thin enough to be flexible and moved by the force developed by the flyweight attached to the blade bodies. The aerodynamic force of the fluid stream acting on the blades is transmitted at the slot to the turbine housing 21 so that the hole housing rotates to drive the turbine shaft 15. The variable exposure type turbine has inherent minimum operating and non-operating drag. The retracting rotor blades reduce blade exposure and change blade angle to achieve power generation over a wide range of altitude or fluid velocity. The invention is useful in producing hydraulic, electrical, or any other type of shaft power and is particularly suitable for applications where low drag and wide range of flight speed are the requirements. Also, when the ram air turbine is utilized for aircraft, it has the advantage that, during non-operation, the turbine blades are not susceptible to damage from debris and careless ground handling because the blades can be completely withdrawn within the turbine housing. Since the force of the blades is transmitted to the blade guide slots, this force is not felt in the governing mechanism and the speed control mechanism is not sensitive to blade pitching moment or aerodynamic forces, but only sensitive to rotational speed. It is apparent that other types of flyball governor can be utilized to position the blades in response to the speed of the turbine shaft and that the shape of the blades, the turbine housing and the slots can be varied to accomplish any desired turbine requirement. Various other modifications are contemplated by those skilled in the art without departing from the spirit and scope of the invention as hereinafter defined by the dependent claims.

What is claimed is:

1. A ram air turbine comprising a rotatable conical turbine housing, a turbine output shaft rigidly connected with said housing and extending axially therefrom, a plurality of flexible turbine blades each connected with a separate blade base located within said turbine housing, separate shaft means carried by said housing for rotatively mounting each of said bases about an axis spaced from and angularly positioned with respect to the axis of said housing, a plurality of curved slots in the surface of said housing each having an angle to the housing axis which decreases as the slots approach the nose of said turbine housing, each of said shaft means being located adjacent one end of a slot nearest the base of said turbine housing and being positioned transverse to said one end, one of said blades being movable through each of said slots by rotation of said shaft means to vary the projected area of the blade and the angle of the blade to the housing axis, and means for rotating said shaft means to position said blades within said slots to develop the desired output on the turbine shaft.

2. A ram air turbine as defined in claim 1 wherein said shaft rotating means comprises means responsive to the speed of said turbine shaft for positioning said blades to maintain a constant turbine shaft speed under condition of varying load and air speed.

3. A ram air turbine as defined in claim 2 wherein said speed responsive means comprises an inertia mass secured to each of said blade bases at one side of the associated shaft means so that outward movement of said inertia means moves the blade connected with the blade base through one of said slots towards the nose of said hub, and spring means located within and structurally interconnected with said turbine housing for biasing each inertia mass against outward movement.

4. A ram air turbine as defined in claim 1 wherein the length of said slots permits movement of said blades from a substantially upright, extended position to a retracted position in which the blades are fully enclosed by said turbine housing.

5. A ram air turbine as defined in claim 4 having actuator means for overriding said shaft rotating means and moving said blades to said retracted position to provide a low turbine drag during inoperativeness of the turbine.

6. A ram air turbine for obtaining power from a flowing fluid comprising a rotatable turbine housing, a turbine output shaft connected with said housing, a plurality of curved blade slots in said housing each having an angle with the housing axis which decreases as the slot approaches the forward end of said housing, a flexible turbine blade movable through each of said blade slots, and means located within said housing and connected to one end of each blade for rotating said blades between a forward retracted position and a rearward extended position, the area of said blades projecting from said housing and the angle of said blades to the housing axis decreasing as the blades move from the extended toward the retracted position.

7. A ram air turbine as defined in claim 6 wherein said blade rotating means comprises speed responsive means for positioning said blades to maintain constant turbine speed under conditions of varying load and air speed, said blades being rotated forwardly upon increase in flight speed during constant load to reduce the projected area and to reduce the blade angle with the housing axis so that the relative air angle does not result in excessive angles of attack.

8. A ram air turbine as defined in claim 7 wherein the length of said slots permits movement of said blades from a substantially upright, extended position to a retracted position in which the blades are fully enclosed by said turbine housing.

References Cited in the file of this patent
UNITED STATES PATENTS 2,178,405    Reggio _____ Oct. 31, 1939

FOREIGN PATENTS 1,059,072    France _____ Nov. 10, 1953